United States Patent Office 2,718,538
Patented Sept. 20, 1955

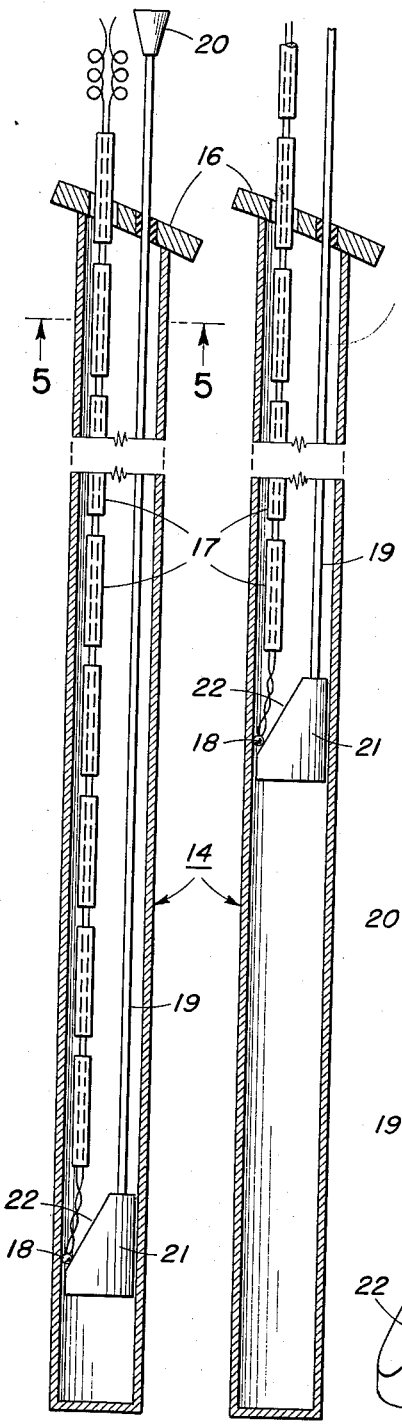
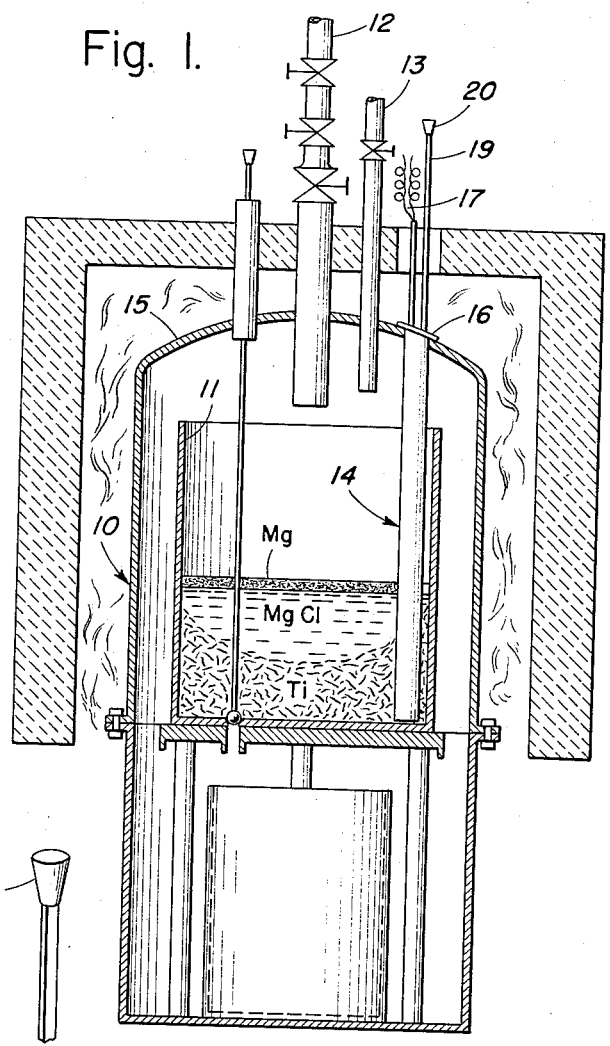
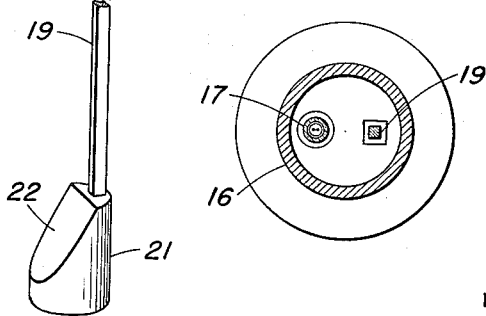
Fig. 1. Fig. 2. Fig. 3. Fig. 4. Fig. 5.
INVENTOR
James L. Wyatt

2,718,538

THERMAL GRADIENT MEASURING DEVICE

James L. Wyatt, Cambridge, Mass., assignor to National Lead Company, New York, N. Y., a corporation of New Jersey Application November 26, 1952, Serial No. 322,783

2 Claims. (Cl. 136—4)

The present invention relates in general to thermal gradient measuring devices and more particularly to an improved thermocouple well assembly.

The production of titanium metal sponge by known processes, such as for example, by the process disclosed in the Kroll Patent No. 2,205,854, June 25, 1940, is carried out by reacting molten magnesium metal with volatile titanium tetrachloride in a reaction pot at an average temperature of 800° C., and in the absence of oxygen, the reaction products being molten magnesium chloride and titanium metal sponge.

It has been observed that in the production of refractory metals and in particular titanium metal by the Kroll type reaction, the reaction temperature within the reaction pot must be kept below about 950° C.; and that when the reaction temperature is allowed to go above 950° C., the walls of the reaction pot will be attacked, thereby causing contamination of the titanium metal sponge in the pot.

The present invention has its conception in the discovery that the reaction between the titanium tetrachloride and molten magnesium metal occurs at a very definite level in the pot corresponding substantially to the level of the layer of molten magnesium; and that in order to obtain accurate readings of the reaction temperature in the reaction pot, the tip of the thermocouple element which is used to maintain a careful check on the reaction temperature within the pot must be held and maintained substantially exactly at the layer of reacting magnesium metal. Vertical displacements of the tip of the thermocouple element of as little as one inch from the reacting layer of magnesium metal has been sufficient to effect a change in temperature reading of as much as 100° C. It is essential, therefore, that the tip of the thermocouple element be at all times held accurately at the reacting magnesium level. Moreover, since the level of the reacting magnesium may change during any given run and with successive runs, it is essential that the thermocouple element be adjustable vertically within the reaction pot.

An object, therefore, of the present invention is to provide an improved thermocouple well assembly by which temperature readings may be taken at substantially exact distances along the length of the well.

A further object of the invention is to provide a thermocouple well assembly wherein a thermocouple may be adjusted to and releasably held in predetermined positions within the well.

These and other objects of the invention will become more apparent from the following more complete description:

In the drawings:

Figure 1 is a schematic vertical sectional view of a reactor for forming titanium metal sponge including the improved thermocouple well assembly of this invention.

Figure 2 is an enlarged fragmentary vertical section of the thermocouple well assembly of this invention showing a thermocouple releasably held at the lower end of the thermocouple well.

Figure 3 is similar to Figure 2 except that the thermocouple is located at a higher position in the well.

Figure 4 is a broken perspective view of the wedge-means for releasably holding the thermocouple at any predetermined point in the thermocouple well; and Figure 5 is an enlarged transverse section of the thermocouple well assembly on section line 5—5 of Figure 2.

By way of example, the improved thermocouple well assembly of this invention will be described as applied to apparatus of the Kroll reactor type for maintaining accurate temperature measurements within the reaction pot. It will be understood, however, that the thermocouple well assembly of this invention may have other applications and that the invention is not limited to the specific application described herein.

Referring to the drawings, Figure 1 shows a reactor of the type used for reacting titanium tetrachloride with molten magnesium metal to form titanium metal sponge. In brief, the reactor comprises a substantially air-tight reactor shell 10 which completely encloses and within which is mounted a reaction pot 11 into which the magnesium metal is fed by way of an inlet pipe 12. A second inlet pipe 13 is provided for feeding the gaseous tetrachloride into the reaction pot.

The thermocouple well of the improved thermocouple well assembly of this invention is indicated generally at 14 and as shown in Figures 2 and 3, comprises a substantially cylindrical pipe preferably formed of stainless steel and closed at its lower end, the overall length of the pipe being sufficient to extend from the bottom of the reaction pot 11 upwardly to a point outside the top wall 15 of the reactor shell 10. The upper end of the thermocouple well 14 extends through an aperture in the top wall 15 of the reactor shell 10 and is provided at its upper extremity with a flanged end wall 16 adapted to close off the upper end of the well and to provide a lip-portion for welding or otherwise securing the thermocouple well to the top wall 15 of the reaction pot with an air-tight seal. The end wall 16 is, in turn, provided with a vertical aperture for accommodating the thermocouple per se, indicated generally at 17, the upper end of which extends freely through the aforesaid aperture in the end wall 16 of the thermocouple well 14, the lower end of the thermocouple and in particular the thermosensitive element 18 of the thermocouple being arranged to extend down freely into the lower end of the thermocouple well as shown in Figures 2 and 3. The exterior portion of the thermocouple, i. e. that portion which extends above the end wall 16 of the well, provides means by which the thermocouple and in particular its thermosensitive element 18 may be moved to predetermined positions vertically in the thermocouple well 14 and hence is hereinafter referred to as manually operated means for actuating the thermocouple. In this connection it is noteworthy that since the thermocouple well assembly is closed at its lower end and secured at its upper end to the top wall 15 of the reactor shell 10 with a joint which is airtight relative to the interior of the reactor shell, there is no necessity for providing air-tight sealing means in the aperture in the flanged end wall 16 of the thermocouple well through which the thermocouple 17 passes.

Mounted in the thermocouple well for cooperative engagement with the thermosensitive element 18 of the thermocouple is wedge-means for releasably holding the thermosensitive element 18 at predetermined positions in the well. Referring especially to Figures 2, 3 and 4, the wedge-means comprises an operating rod 19 which is slidable longitudinally in a bushed aperture in the end wall 16 of the well and is of sufficient length to provide a handle portion 20 which extends above the end wall 16; and a wedge-block 21 which is secured to the lower end of the operating rod 19 and, as shown especially in Figure 4, comprises a solid substantially cylindrical block having one side slabbed off longitudinally thereof to provide a substantially flat inclined surface 22. The overall diameter of the wedge-block 21 is only slightly less than the internal diameter of the thermocouple well and, as a consequence, by drawing the wedge-block 21 upwardly relative to the thermosensitive element 18 of the thermocouple, the element 18 will be engaged by the flat inclined surface 22 of the wedge-block and forced thereby against the adjacent inner wall of the thermocouple well 14 both to securely but releasably hold the thermosensitive element in fixed position in the thermocouple well and to wedge the thermosensitive element against the wall of the well so as to insure intimate contact therewith. Thus, the transfer of heat from the layer of molten magnesium metal to the thermosensitive element 18 will be by conduction rather than by radiation which is relatively insensitive to small temperature changes.

To insure against the wedge-block rotating to a position such that the flat inclined surface 22 would be displaced from its normal position in juxtaposition to the thermosensitive element 18 of the thermocouple, the operating rod 19 is preferably of rectangular or square cross section and adapted to engage in an aperture of corresponding cross section in the bushing of the apertured end wall 16, so that a sort of key is formed which prevents rotation of the wedge-block in the well. It will be understood, however, that equivalent means for preventing rotation of the wedge-block are included within the purview of the invention.

To operate the thermocouple and thermocouple well assembly of this invention the thermosensitive element 18 of the thermocouple is adjusted longitudinally in the thermocouple well 14 to a point corresponding substantially to the layer of molten magnesium metal in the reaction pot, the adjustment of the thermosensitive element 18 being made by manually actuating the upper end portion of the thermocouple which extends exteriorly of the thermocouple well. Having adjusted the thermosensitive element 18 to a predetermined position in the well, the wedge-block is then moved, by actuating the rod 19, so as to engage the flat inclined surface 22 of the wedge-block against the thermosensitive element 18 and force the latter firmly against the inner adjacent wall of the thermocouple well, thereby holding the thermosensitive element 18 against movement longitudinally therein. To release the thermosensitive element 18, either to reposition it in the well or to permit removal of the thermocouple element from the well, the operating rod 19 is moved downwardly in the well so as to displace the wedge-block downwardly relative to the thermosensitive element 18 and hence disengage the flat inclined surface 22 of the wedge-block therefrom.

From the foregoing description and drawings, it will be clear that the improved temperature measuring means of this invention comprises a relatively simple, durable and inexpensive thermocouple well assembly which may be introduced into a heated region in which temperature measurements are desired in a manner to preclude the admission of air or other gases which might contaminate the products in the heated region; and that the thermosensitive element of the thermocouple may be adjusted to any predetermined position in the well so as to be in immediate juxtaposition to the hottest portion of the heated region and releasably held in this position with ease and dispatch.

While this invention has been described and illustrated by the examples shown, it is not intended to be strictly limited thereto, and other variations and modifications may be employed within the scope of the following claims.

I claim:

1. In a thermal measuring device, the combination including: an imperforate thermocouple well; a thermocouple including a thermosensitive element arranged to extend into said well; manually operated means arranged exteriorly of said well for moving said thermocouple and said thermosensitive element longitudinally of said well; a manually operated wedge-block supported in said well and arranged to be moved longitudinally therein independently of the thermosensitive element of said thermocouple, said wedge-block having an inclined surface arranged to be moved into contact with said thermosensitive element to releasably engage and hold said thermosensitive element positively against the adjacent wall of said well and at predetermined positions longitudinally thereof; a wedge-block operating rod secured at its lower end to said wedge-block and extending therefrom exteriorly of said well to move said wedge-block into and from engagement with said thermosensitive element; and a key cooperatively engaged with said wedge-block operating rod to prevent rotation of said wedge-block in said well.

2. In an apparatus for forming refractory metals the combination including: an air-tight reactor shell; a reaction pot in said shell; a thermocouple well assembly arranged to extend into said reaction pot; an airtight seal between said assembly and said reactor shell said thermocouple well assembly comprising a thermocouple including a thermosensitive element movable longitudinally of said well; wedge-block movably mounted in said well independently of said thermosensitive element; an operating rod connected to said wedge-block and extending therefrom exteriorly of said reactor shell for moving said wedge-block into and from engagement with said thermosensitive element to releasably hold said thermosensitive element positively against the adjacent wall of said well at any predetermined position longitudinally thereof; and operating-rod engaging means in said reactor shell arranged to preclude rotation of said wedge-block relative to said thermosensitive element.

References Cited in the file of this patent

UNITED STATES PATENTS

| | | |
|---|---|---|
| 1,156,317 | Santos et al. | Oct. 12, 1915 |
| 1,928,732 | Muir | Oct. 3, 1933 |
| 2,127,529 | Prickett | Aug. 23, 1938 |
| 2,646,681 | Walton | July 28, 1953 |

FOREIGN PATENTS

| | | |
|---|---|---|
| 441,766 | Great Britain | Jan. 23, 1936 |